Figure 3:
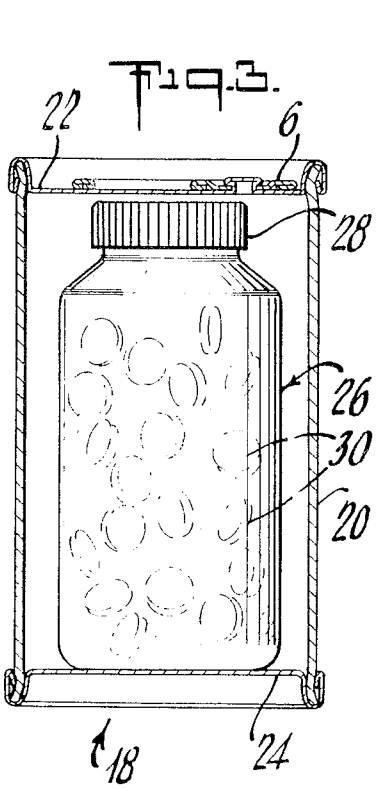
Figure 2:
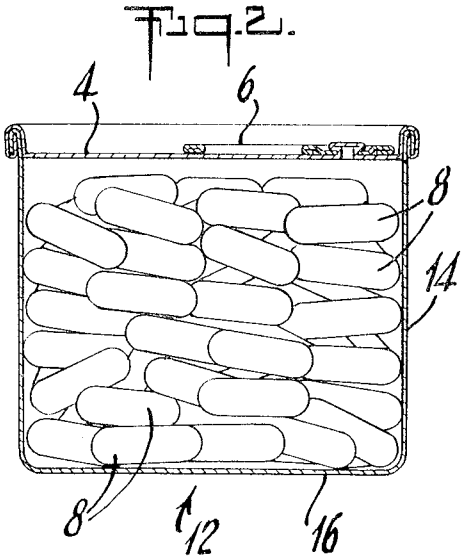
Figure 1:
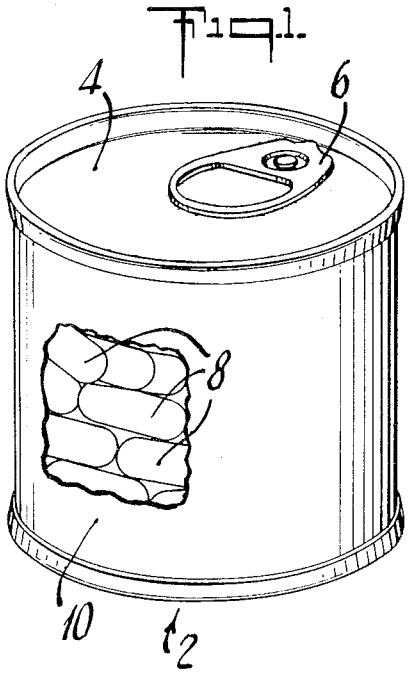

United States Defensive Publication [19] (H) [11] T105,302

Hoffman, Jr. [43] Apr. 2, 1985

[54] TAMPER-RESISTANT CONTAINER

[76] Inventor: Joseph E. Hoffman, Jr., P.O. Box 300, Morrisville, N.C. 27560

[21] Appl. No.: 611,375

[22] Filed: May 16, 1984

Related U.S. Application Data

[63] Continuation of Ser. No. 477,996, Mar. 23, 1983, abandoned.

[51] Int. Cl.[3] ..... B65D 85/56; B65D 83/04; B65D 81/20; B65D 17/32

[52] U.S. Cl. ..... 206/524.8; 206/540; 206/534; 206/807; 220/273

[57] ABSTRACT

A tamper-resistant container containing a pharmaceutical preparation, wherein the container is a removable full-panel easy-open metal top end closure having an opening tab for irreversibly removing said end closure, whereby once the end closure is opened, that fact will be readily ascertainable from the appearance of the container.

6 Claims, 1 Sheet Drawing,

10 Pages Specification

The file of this unexamined application may be inspected and copies thereof may be purchased (849 O.G. 1221, Apr. 9, 1968).

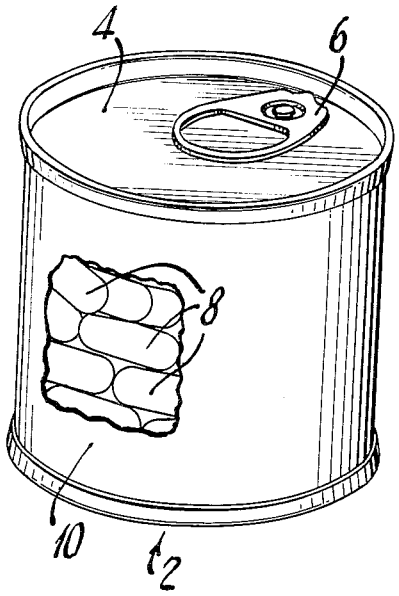

6
28
26
30
20
22
24
18

6
8
14
4
16
12
8

6
4
8
2
10